United States Patent
Morrison et al.

(10) Patent No.: US 10,924,525 B2
(45) Date of Patent: Feb. 16, 2021

(54) INDUCING HIGHER INPUT LATENCY IN MULTIPLAYER PROGRAMS

(71) Applicant: Microsoft Technology Licensing, LLC, Redmond, WA (US)

(72) Inventors: Jonathan David Morrison, North Bend, WA (US); Eduardo A. Cuervo Laffaye, Redmond, WA (US); Hoi Huu Vo, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 30 days.

(21) Appl. No.: 16/148,953

(22) Filed: Oct. 1, 2018

(65) Prior Publication Data
US 2020/0106819 A1 Apr. 2, 2020

(51) Int. Cl.
| | |
|---|---|
| *G06F 15/16* | (2006.01) |
| *H04L 29/06* | (2006.01) |
| *H04L 12/24* | (2006.01) |
| *A63F 13/355* | (2014.01) |
| *A63F 13/358* | (2014.01) |

(52) U.S. Cl.
CPC .......... *H04L 65/602* (2013.01); *A63F 13/355* (2014.09); *A63F 13/358* (2014.09); *H04L 41/20* (2013.01); *H04L 65/607* (2013.01)

(58) Field of Classification Search
CPC .................................................... A63F 13/358
USPC .......................................................... 709/219
See application file for complete search history.

(56) References Cited

U.S. PATENT DOCUMENTS

| | | | |
|---|---|---|---|
| 6,148,005 A | 11/2000 | Paul et al. | |
| 6,233,283 B1 | 5/2001 | Chiu et al. | |
| 6,359,603 B1 | 3/2002 | Zwern | |
| 6,415,317 B1 | 7/2002 | Yelon et al. | |
| 7,068,274 B2 | 6/2006 | Welch et al. | |
| 7,224,382 B2 | 5/2007 | Baker | |
| 7,432,932 B2 | 10/2008 | San et al. | |
| 7,522,167 B1 | 4/2009 | Diard et al. | |

(Continued)

FOREIGN PATENT DOCUMENTS

| | | |
|---|---|---|
| CN | 106686472 A | 5/2017 |
| EP | 1837060 A1 | 9/2007 |

OTHER PUBLICATIONS

Application as Filed in U.S. Appl. No. 15/628,512, filed Jun. 20, 2017, 40 Pages.

(Continued)

*Primary Examiner* — Hee Soo Kim
(74) *Attorney, Agent, or Firm* — Alleman Hall Creasman & Tuttle LLP

(57) ABSTRACT

A server computing device for inducing latency on target input streams is provided. The server computing device includes a processor configured to receive a plurality of input streams from a respective plurality of client computing devices. Each input stream includes a plurality of inputs controlling actions of respective characters in a multiplayer online software program. The processor is further configured to determine a latency of each of the input streams, identify a higher latency input stream and a lower latency input stream among the plurality of input streams, and induce a higher latency in the lower latency input stream to narrow a difference in latency between the higher latency input stream and the lower latency input stream.

19 Claims, 6 Drawing Sheets

(56) References Cited

U.S. PATENT DOCUMENTS

| | | | |
|---|---|---|---|
| 7,627,632 B2 | 12/2009 | Douceur et al. | |
| 7,684,752 B2 | 3/2010 | Perlman | |
| 7,849,491 B2 | 12/2010 | Perlman | |
| 8,009,022 B2 | 8/2011 | Kipman et al. | |
| 8,147,339 B1 | 4/2012 | Perry | |
| 8,203,568 B2 | 6/2012 | Clemie et al. | |
| 8,386,560 B2 | 2/2013 | Ma et al. | |
| 8,396,122 B1 | 3/2013 | Taylor | |
| 8,403,757 B2* | 3/2013 | Mizrachi | A63F 13/12 463/42 |
| 8,500,558 B2 | 8/2013 | Smith | |
| 8,537,899 B1 | 9/2013 | Taylor | |
| 8,566,696 B1 | 10/2013 | Hamon et al. | |
| 8,643,701 B2 | 2/2014 | Nguyen et al. | |
| 8,774,267 B2 | 7/2014 | Gaddy et al. | |
| 9,264,749 B2 | 2/2016 | Wolman et al. | |
| 9,756,375 B2 | 9/2017 | Chu et al. | |
| 9,824,498 B2 | 11/2017 | Mallinson | |
| 9,955,194 B2 | 4/2018 | Wolman et al. | |
| 2002/0142843 A1* | 10/2002 | Roelofs | A63F 13/12 463/42 |
| 2002/0158873 A1 | 10/2002 | Williamson | |
| 2004/0152519 A1 | 8/2004 | Wang et al. | |
| 2004/0261113 A1 | 12/2004 | Paul et al. | |
| 2007/0070914 A1* | 3/2007 | Abigail | H04L 67/325 370/252 |
| 2007/0094700 A1 | 4/2007 | Wolfe | |
| 2009/0119736 A1 | 5/2009 | Perlman et al. | |
| 2009/0125961 A1 | 5/2009 | Perlman et al. | |
| 2009/0125967 A1 | 5/2009 | Perlman et al. | |
| 2009/0144448 A1 | 6/2009 | Smith | |
| 2009/0278842 A1* | 11/2009 | Peterfreund | H04N 19/117 345/419 |
| 2010/0007582 A1 | 1/2010 | Zalewski | |
| 2010/0035695 A1 | 2/2010 | Douceur et al. | |
| 2010/0134505 A1 | 6/2010 | Andersen | |
| 2010/0166064 A1 | 7/2010 | Perlman et al. | |
| 2010/0167809 A1 | 7/2010 | Perlman et al. | |
| 2010/0265248 A1 | 10/2010 | Mccrae et al. | |
| 2010/0273553 A1 | 10/2010 | Zalewski | |
| 2010/0281402 A1 | 11/2010 | Staikos et al. | |
| 2010/0285879 A1 | 11/2010 | Huang et al. | |
| 2010/0285883 A1 | 11/2010 | Zalewski | |
| 2010/0304868 A1 | 12/2010 | Zalewski | |
| 2010/0306402 A1 | 12/2010 | Russell et al. | |
| 2011/0086706 A1 | 4/2011 | Zalewski | |
| 2011/0092291 A1 | 4/2011 | Perlman | |
| 2011/0118032 A1 | 5/2011 | Zalewski | |
| 2011/0124410 A1 | 5/2011 | Mao et al. | |
| 2011/0195782 A1 | 8/2011 | Mao et al. | |
| 2011/0216002 A1 | 9/2011 | Weising et al. | |
| 2011/0216060 A1 | 9/2011 | Weising et al. | |
| 2011/0260830 A1 | 10/2011 | Weising | |
| 2011/0304713 A1 | 12/2011 | Tardif et al. | |
| 2012/0004042 A1 | 1/2012 | Perry et al. | |
| 2012/0229445 A1 | 9/2012 | Jenkins | |
| 2012/0254780 A1 | 10/2012 | Mouton et al. | |
| 2012/0256949 A1 | 10/2012 | Treat et al. | |
| 2012/0258800 A1 | 10/2012 | Mikhailov | |
| 2012/0266068 A1 | 10/2012 | Ryman et al. | |
| 2012/0306907 A1 | 12/2012 | Huston | |
| 2012/0327113 A1 | 12/2012 | Huston | |
| 2012/0331058 A1 | 12/2012 | Huston et al. | |
| 2013/0014064 A1* | 1/2013 | Zhu | H04L 67/2885 715/850 |
| 2013/0038618 A1 | 2/2013 | Urbach | |
| 2013/0072301 A1 | 3/2013 | Mallinson | |
| 2013/0106855 A1 | 5/2013 | Urbach | |
| 2013/0123004 A1 | 5/2013 | Kruglick | |
| 2013/0132510 A1 | 5/2013 | Ye et al. | |
| 2013/0147820 A1 | 6/2013 | Kalai et al. | |
| 2013/0178293 A1 | 7/2013 | Nakayama et al. | |
| 2013/0212162 A1 | 8/2013 | Somadder | |
| 2013/0227052 A1 | 8/2013 | Wenzel et al. | |
| 2013/0260896 A1 | 10/2013 | Miura et al. | |
| 2013/0268573 A1 | 10/2013 | Lee | |
| 2013/0296052 A1 | 11/2013 | Smith | |
| 2013/0304798 A1 | 11/2013 | Chang et al. | |
| 2013/0335591 A1 | 12/2013 | Fujino et al. | |
| 2014/0064607 A1 | 3/2014 | Grossmann et al. | |
| 2014/0094299 A1 | 4/2014 | Stine et al. | |
| 2014/0173674 A1 | 6/2014 | Wolman et al. | |
| 2014/0176591 A1 | 6/2014 | Klein et al. | |
| 2014/0189091 A1* | 7/2014 | Tamasi | H04L 43/0876 709/224 |
| 2014/0213367 A1 | 7/2014 | Fiedler et al. | |
| 2014/0226901 A1* | 8/2014 | Spracklen | G06F 3/1454 382/167 |
| 2014/0365412 A1 | 12/2014 | Mizrachi | |
| 2014/0375634 A1 | 12/2014 | Hillesland et al. | |
| 2015/0234455 A1 | 8/2015 | Lavalle et al. | |
| 2015/0363976 A1 | 12/2015 | Henson | |
| 2016/0023109 A1 | 1/2016 | Colenbrander | |
| 2016/0086379 A1 | 3/2016 | Sadi et al. | |
| 2016/0092021 A1 | 3/2016 | Tu et al. | |
| 2016/0134907 A1 | 5/2016 | Wolman et al. | |
| 2016/0191592 A1 | 6/2016 | Asveren | |
| 2016/0219325 A1 | 7/2016 | Chu et al. | |
| 2016/0293133 A1 | 10/2016 | Dutt | |
| 2017/0043249 A1 | 2/2017 | Bartlett et al. | |
| 2017/0093939 A1 | 3/2017 | Bar-mashiah et al. | |
| 2017/0094262 A1 | 3/2017 | Peterson et al. | |
| 2017/0366838 A1 | 12/2017 | Chu et al. | |

OTHER PUBLICATIONS

"Amazon AppStream", Retrieved from https://web.archive.org/web/20140915223832/http://aws.amazon.com/appstream/, Retrieved on Nov. 9, 2014, 8 Pages.

"Intel Quick Sync Video", Retrieved from https://web.archive.org/web/20141001095343/http://www.intel.com/content/www/us/en/architecture-and-technology/quick-sync-video/quick-sync-video-general.html, Retrieved on Oct. 1, 2014, 4 Pages.

"Nvidia Grid Cloud Gaming Beta", Retrieved from: https://web.archive.org/web/20140916034916/http://shield.nvidia.com/grid, Retrieved on: Sep. 11, 2014, 3 Pages.

"NVIDIA Video Codec SDK", Retrieved from https://web.archive.org/web/20141209194747/https://developer.nvidia.com/nvidia-video-codec-sdk, Retrieved on Sep. 11, 2014, 3 Pages.

"PlayStation Now PS4 Open Beta Now Live!", Retrieved From: https://web.archive.org/web/20140908142018/http://www.playstation.com/en-us/explore/psnow, Retrieved on: Sep. 11, 2014, 4 Pages.

"Sponging is no Longer a Myth", Retrieved from http://youtu.be/Bt433RepDwM, Apr. 2, 2013, 4 Pages.

"Unreal Networking Architecture", Retrieved From: https://docs.unrealengine.com/udk/Three/NetworkingOverview.html, Retrieved on Sep. 11, 2014, 21 Pages.

"Non Final Office Action Issued in U.S. Appl. No. 13/714,379", dated Dec. 13, 2013, 52 Pages.

"Non Final Office Action Issued in U.S. Appl. No. 13/714,379", dated Apr. 10, 2015, 62 Pages.

"Final Office Action Issued in U.S. Appl. No. 13/714379", dated Jun. 27, 2014, 57 Pages.

Zielinski, et al., "Exploring the Effects of Image Persistence in Low Frame Rate Virtual Environments", In Proceedings of IEEE Virtual Reality, Mar. 23, 2015, pp. 19-26.

"Notice of Allowance in U.S. Appl. No. 14/603,213", dated May 3, 2017, 10 Pages.

"Final Office Action Issued in U.S. Appl. No. 15/000,316", dated Aug. 21, 2017, 50 Pages.

"Non Final Office Action Issued in U.S. Appl. No. 15/000,316", dated Mar. 23, 2017, 52 Pages.

"Final Office Action Issued in U.S. Appl. No. 15/691,608", dated Nov. 5, 2018, 14 Pages.

"Non Final Office Action Issued in U.S. Appl. No. 15/691,608", dated Jun. 4, 2018, 21 Pages.

Allman, Mark, "Comments on Bufferbloat", In ACM SIGCOMM Computer Communication Review, vol. 43, Issue 1, Jan. 9, 2013, 7 Pages.

(56) References Cited

OTHER PUBLICATIONS

Beigbeder, et al., "The Effects of Loss and Latency on user Performance in Unreal Tournament", In Proceedings of 3rd ACM SIGCOMM Workshop on Network and System Support for Games, Aug. 30, 2004, 8 Pages.

Bharambe, et al., "Colyseus: A Distributed Architecture for Online Multiplayer Games", In Proceedings of the 3rd conference on Networked Systems Design & Implementation, vol. 6, May 8, 2006, 14 Pages.

Bharambe, et al., "Donnybrook: Enabling Large-Scale, High-Speed, Peer-to-Peer Games", In Proceedings of the ACM SIGCOMM Computer Communication Review, vol. 38, Issue 4, Aug. 17, 2008, 12 Pages.

Buehler, et al., "Unstructured Lumigraph Rendering", In Proceedings of the 28th Annual Conference on Computer Graphics and Interactive Techniques, Aug. 1, 2001, 8 Pages.

Chaudhuri, et al., "Distributed Rendering of Virtual Worlds", In Technical Report of CSTR, Jan. 2, 2008, 9 Pages.

Chen, et al., "View Interpolation for Image Synthesis", In Proceedings of the 20th Annual Conference on Computer Graphics and Interactive Techniques, Sep. 1, 1993, pp. 279-288.

Cheng, et al., "Using Mobile GPU for General-Purpose Computing—A Case Study of Face Recognition on Smartphones", In Proceedings of International Symposium on VLSI Design, Automation and Test (VLSI-DAT), Apr. 25, 2011, 4 Pages.

Chow, et al., "A Message Update Model for a Large-scale Multiuser Networked Virtual Environment System", In Journal of Multimedia Cyberscape, Jul. 24, 2005, 12 Pages.

Chow, et al., "The ARP Virtual Reality System in Addressing Security Threats and Disaster Scenarios", In IEEE Region 10 Conference of TENCON, Nov. 21, 2005, 7 Pages.

Chun, et al., "CloneCloud: Elastic Execution between Mobile Device and Cloud", In Proceedings of the sixth Conference on Computer Systems, Apr. 10, 2011, 14 Pages.

Cuervo, et al., "MAUI: Making Smartphones Last Longer with Code Offload", In Proceedings of the 8th International Conference on Mobile Systems, Applications and Services, Jun. 15, 2010, 14 Pages.

Debevec, et al., "Modeling and Rendering Architecture from Photographs: A Hybrid Geometry- and Image-Based Approach", In Proceedings of the 23rd Annual Conference on Computer Graphics and Interactive Techniques, Aug. 1, 1996, pp. 11-20.

Dick, et al., "Analysis of Factors Affecting Players' Performance and Perception in Multiplayer Games", In Proceedings of 4th ACM SIGCOMM workshop on Network and System Support for Games, Oct. 10, 2005, 7 Pages.

Douceur, et al., "Leveraging Legacy Code to Deploy Desktop Applications on the Web", In Proceedings of 8th USENIX Conference on Operating Systems Design and Implementation,vol. 8, Dec. 8, 2008, 19 Pages.

Fernando, Randima, "GPU Gems: Programming Techniques, Tips and Tricks for Real-Time Graphics", by Addison-Wesley Professional, Apr. 1, 2004, 5 Pages.

Flinn, et al., "Can Deterministic Replay be an Enabling Tool for Mobile Computing?", In Proceedings of the 12th Workshop on Mobile Computing Systems and Applications, Mar. 1, 2011, 6 Pages.

Horvitz, et al., "Perception, Attention, and Resources: A Decision-Theoretic Approach to Graphics Rendering", In the Proceedings of the 13th Conference on Uncertainty in Artificial Intelligence, Aug. 1, 1997, pp. 238-249.

Huang, et al., "A Close Examination of Performance and Power Characteristics of 4G LTE Networks", In Proceedings of the 10th International Conference on Mobile Systems, Applications, and Services, Jun. 25, 2012, 14 Pages.

Huang, et al., "An In-Depth Study of LTE: Effect of Network Protocol and Application Behavior on Performance", In ACM SIGCOMM Computer Communication Review, vol. 43, Issue 4, Aug. 12, 2013, 12 Pages.

Huang, et al., "Interactive Illustrative Rendering on Mobile Devices", In Journal of IEEE Computer Graphics and Applications, vol. 1, Issue 3, May 1, 2007, 9 Pages.

Jefferson, D., "Distributed Simulation and the Time Warp Operating System", In Proceedings of the Eleventh ACM Symposium on Operating Systems Principles, Nov. 1, 1987, pp. 77-93.

Kalman, R. E, "A New Approach to Linear Filtering and Prediction Problems", In Journal of Basic Engineering, vol. 82, Issue 1, Mar. 1, 1960, 12 Pages.

Kan, Michael, "PopCap Games CEO: Android Still Too Fragmented, China Helping Company Innovate", Retrieved from http://www.pcworld.com/article/255373/popcap_games_ceo_android_still_too_fragmented_china_helping_company_innovate.html, May 10, 2012, 9 Pages.

Khaw, Cassandra, "Game Developers still not sold on Android", Retrieved from https://web.archive.org/web/20130419111327/http://www.techhive.com/article/2032740/game-developers-still-not-sold-on-android.html, Apr. 2, 2013, 10 Pages.

Kniss, et al., "Interactive Texture-Based Volume Rendering for Large Data Sets", In Proceedings of IEEE Computer Graphics and Applications, vol. 1, Issue 4, Jul. 2001, pp. 52-61.

Lange, et al. "Experiences with Client-based Speculative Remote Display", In Proceedings of USENIX Annual Technical Conference, Jun. 22, 2008, 14 Pages.

Lee, et al., "Outatime: Using Speculation to Enable Low-Latency Continuous Interaction for Mobile Cloud Gaming", In Proceedings of the 13th Annual International Conference on Mobile Systems, Applications, and Services, May 18, 2015, 15 Pages.

Levoy, Marc, "Polygon-Assisted JPEG and MPEG Compression of Synthetic Images", In Proceedings of the 22nd Annual Conference on Computer Graphics and Interactive Techniques, Sep. 15, 1995, pp. 21-28.

Lietsch et al. "A CUDA-Supported Approach to Remote Rendering", In Proceedings of the International Symposium on Visual Computing, Nov. 26, 2007, pp. 724-733.

Mann, et al., "Selective Pixel Transmission for Navigating in Remote Virtual Environments", In Proceedings of Computer Graphics Forum, vol. 16, Issue 3, Sep. 1997, 6 Pages.

Mark, et al., "Post-Rendering 3d Warping", In Proceedings of Symposium on Interactive 3D Graphics, Apr. 30, 1997, pp. 7-16.

Mickens, et al., "Crom: Faster Web Browsing using Speculative Execution", In Proceedings of the 7th USENIX Conference on Networked Systems Design and Implementation, vol. 10, Apr. 28, 2010, 16 Pages.

Nightingale, et al., "Speculative Execution in a Distributed File System", In Proceedings of the Twentieth ACM Symposium on Operating Systems Principles Operating Systems Review, vol. 39, Issue 5, Oct. 23, 2005, 32 Pages.

Pajak, et al., "Scalable Remote Rendering with Depth and Motion-How Augmented Streaming", In Proceedings of Computer Graphics Forum, vol. 30, Issue 2, Apr. 2011, 10 Pages.

Pasman, et al., "Low Latency Rendering for Mobile Augmented Reality", In International Journal/Conference Paper of UbiCom, Faculty of Information and Systems, Delft University of Technology, Jun. 1999, 7 Pages.

Quax et al., "Objective and Subjective Evaluation of the Influence of Small Amounts of Delay and Jitter on a Recent First Person Shooter Game", In Proceedings of 3rd ACM SIGCOMM Workshop on Network and System Support for Games, Aug. 30, 2004, pp. 152-156.

Regan, et al., "Priority Rendering with a Virtual Reality Address Recalculation Pipeline", In Proceedings of the 21st International ACM Conference on Computer Graphics and Interactive Techniques, Jul. 24, 1994, 8 Pages.

Shade, Jonathan, et al., "Layered Depth Images", In Computer Graphics Proceedings of Annual Conference Series, Jul. 19, 1998, 12 Pages.

Shum, et al., "Rendering with Concentric Mosaics", In Proceedings of the 26th Annual Conference on Computer Graphics and Interactive Techniques, Jul. 1, 1999, pp. 299-306.

Sjoberg, et al., "Nonlinear Black-Box Modeling in System Identification: A Unified Overview", In Journal of Automatica (Journal of

(56) References Cited

OTHER PUBLICATIONS

IFAC)—Special Issue on trends in system identification, vol. 31, Issue 12, Jun. 21, 1995, 55 Pages.
Smit, et al., "A Shared-Scene-Graph Image-Warping Architecture for VR: Low Latency Versus Image Quality", In Proceedings of Computer & Graphics, vol. 34, Issue 1, Feb. 1, 2010, 14 Pages.
Sommers, et al., "Cell vs. WiFi: On the Performance of Metro Area Mobile Connections", In Proceedings of the ACM Conference on Internet Measurement Conference, Nov. 14, 2012, 14 Pages.
Sundaresan, et al., "Broadband Internet Performance: A View from the Gateway", In Proceedings of the ACM SIGCOMM Computer Communication Review, vol. 41, Issue 4, Aug. 15, 2011, 12 Pages.
Szeliski, Richard, "Computer Vision: Algorithms and Applications", In Publication of Springer-Verlag London, Feb. 27, 2010, 874 Pages.
Chen, et al., "How sensitive are online garners to network quality?", In Magazine Communications of the ACM—Entertainment networking, vol. 49, Issue 11, Nov. 2006, pp. 34-38.
Tate, Ryan, "As Android Rises, App Makers Tumble Into Google's 'Matrix of Pain'", Retrieved from https://www.wired.com/2013/08/android-matrix-of-pain/, Aug. 26, 2013, 5 Pages.
Tizon, et al., "ROI Based Video Streaming for 3D Remote Rendering", In Proceedings of 13th International Workshop on Multimedia Signal Processing, Oct. 17, 2011, 6 Pages.
Wang, et al., "Addressing Response Time and Video Quality in Remote Server based Internet Mobile Gaming", In Proceedings of Wireless Communications and Networking Conference, Apr. 18, 2010, 6 Pages.
Welch, et al., "Motion Tracking: No Silver Bullet, but a Respectable Arsenal", In International Journal of IEEE on Computer Graphics and Application, vol. 22, Issue 6, Nov. 2002, 15 Pages.
Wester, et al., "Operating System Support for Application-Specific Speculation", In Proceedings of the 6th Conference on Computer Systems, Apr. 10, 2011, 14 Pages.
Winstein, et al., "Mosh: An Interactive Remote Shell for Mobile Clients", In Proceedings of the USENIX Conference on Annual Technical Conference, Jun. 13, 2012, 6 Pages.
Yoo, et al., "Real-Time Parallel Remote Rendering for Mobile Devices using Graphics Processing Units", In Proceedings of International Conference on Multimedia and Expo, Jul. 19, 2010, pp. 902-907.
Bernier, Yahn W., "Latency Compensating Methods in Client/Server In-game Protocol Design and Optimization—Valve Developer Community", Retrieved from: https://developer.valvesoftware.com/wiki/Latency_Compensating_Methods_in_Client/Server_In-game_Protocol_Design_and_Optimization, Jan. 1, 2001, 12 Pages.
"International Search Report and Written Opinion Issued in PCT Application No. PCT/US2019/050713", dated Nov. 27, 2019, 14 Pages.

\* cited by examiner

- RECEIVING A PLURALITY OF INPUT STREAMS FROM A RESPECTIVE PLURALITY OF CLIENT COMPUTING DEVICES, EACH INPUT STREAM INCLUDING A PLURALITY OF INPUTS CONTROLLING ACTIONS OF RESPECTIVE CHARACTERS IN A MULTIPLAYER ONLINE SOFTWARE PROGRAM 502

- DETERMINING A LATENCY OF EACH OF THE INPUT STREAMS 504

- PREDICTING A LONG-TERM LATENCY FOR EACH OF THE PLURALITY OF INPUT STREAMS 506

- IDENTIFYING A HIGHER LATENCY INPUT STREAM AND A LOWER LATENCY INPUT STREAM AMONG THE PLURALITY OF INPUT STREAMS 508

- INDUCING A HIGHER LATENCY IN THE LOWER LATENCY INPUT STREAM TO NARROW A DIFFERENCE IN LATENCY BETWEEN THE HIGHER LATENCY INPUT STREAM AND THE LOWER LATENCY INPUT STREAM 510

- INCREASING THE INDUCED HIGHER LATENCY IN ONE OR MORE LOWER LATENCY INPUT STREAMS UP TO A HIGHEST PREDICTED LONG-TERM LATENCY OF THE PLURALITY OF INPUT STREAMS 512

- RENDERING OUTPUT FRAMES FOR A SOFTWARE PROGRAM STATE OF THE MULTIPLAYER ONLINE SOFTWARE PROGRAM FOR EACH OF THE PLURALITY OF CLIENT COMPUTING DEVICE AT A CONTROLLABLE FRAMERATE 514

- SENDING THE RENDERED OUTPUT FRAMES IN A PLURALITY OF OUTPUT FRAME STREAMS TO THE RESPECTIVE PLURALITY OF CLIENT COMPUTING DEVICES 516

- CAUSING EACH CLIENT COMPUTING DEVICE TO INTERPOLATE INTERMEDIATE FRAMES BASED ON ONE OR MORE OUTPUT FRAMES IN THE OUTPUT FRAME STREAMS TO ACHIEVE THE TARGET FRAMERATE 518

INDUCING HIGHER INPUT LATENCY IN MULTIPLAYER PROGRAMS

BACKGROUND

Typical multiplayer online software programs include local software program states that are executed on each player's client computing device. Each local software program state is updated based on the local user's input, which is also sent to a server system that maintains a server software program state that serves as an arbiter of the "ground truth" of the state for the multiplayer session. However, due to network latency, each player's local software program state may become slightly different than the server software program state and the local software program states of other players. Lag compensation techniques may be employed to sync the local software program states to the server software program state. However, these techniques may not be applicable if a player's client computing device is a thin client computing device that does not typically execute the software program.

SUMMARY

To address the issues described above, a server computing device for inducing latency on target input streams is provided. The server computing device may include a processor configured to receive a plurality of input streams from a respective plurality of client computing devices. Each input stream may include a plurality of inputs controlling actions of respective characters in a multiplayer online software program. The processor may be further configured to determine a latency of each of the input streams, identify a higher latency input stream and a lower latency input stream among the plurality of input streams, and induce a higher latency in the lower latency input stream to narrow a difference in latency between the higher latency input stream and the lower latency input stream.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 shows a computer-implemented method for inducing higher latency in low latency input streams implemented by the computing system of FIG. 1.

DETAILED DESCRIPTION

Typical multiplayer online software programs include local software program states that are executed on each user's client computing device. Each local software program state may be immediately updated based on the local user's input. That input may be further sent to a server system that is executing and managing a server software program state that serves as an arbiter of the "ground truth" for the multiplayer online software program. Thus, each users' local software program state may be synced and updated to the server software program state to reflect the user input entered by each other user in the multiplayer online software program. Due to network latency, each player's local software program state may become different than the server software program state. For example, while a first user's input may be immediately reflected in the local software program state executed by that user's client computing device, that same input may not be reflected in other users' local software program states until it has been sent to the server system, processed by the server system to affect the server software program state of the multiplayer online software program, and communicated to the client computing devices of each other user. Typically, multiplayer online software programs utilize different latency compensation techniques on the client computing devices to help minimize potential user experience degrading effects of high and/or unstable network latencies.

Figure 1:
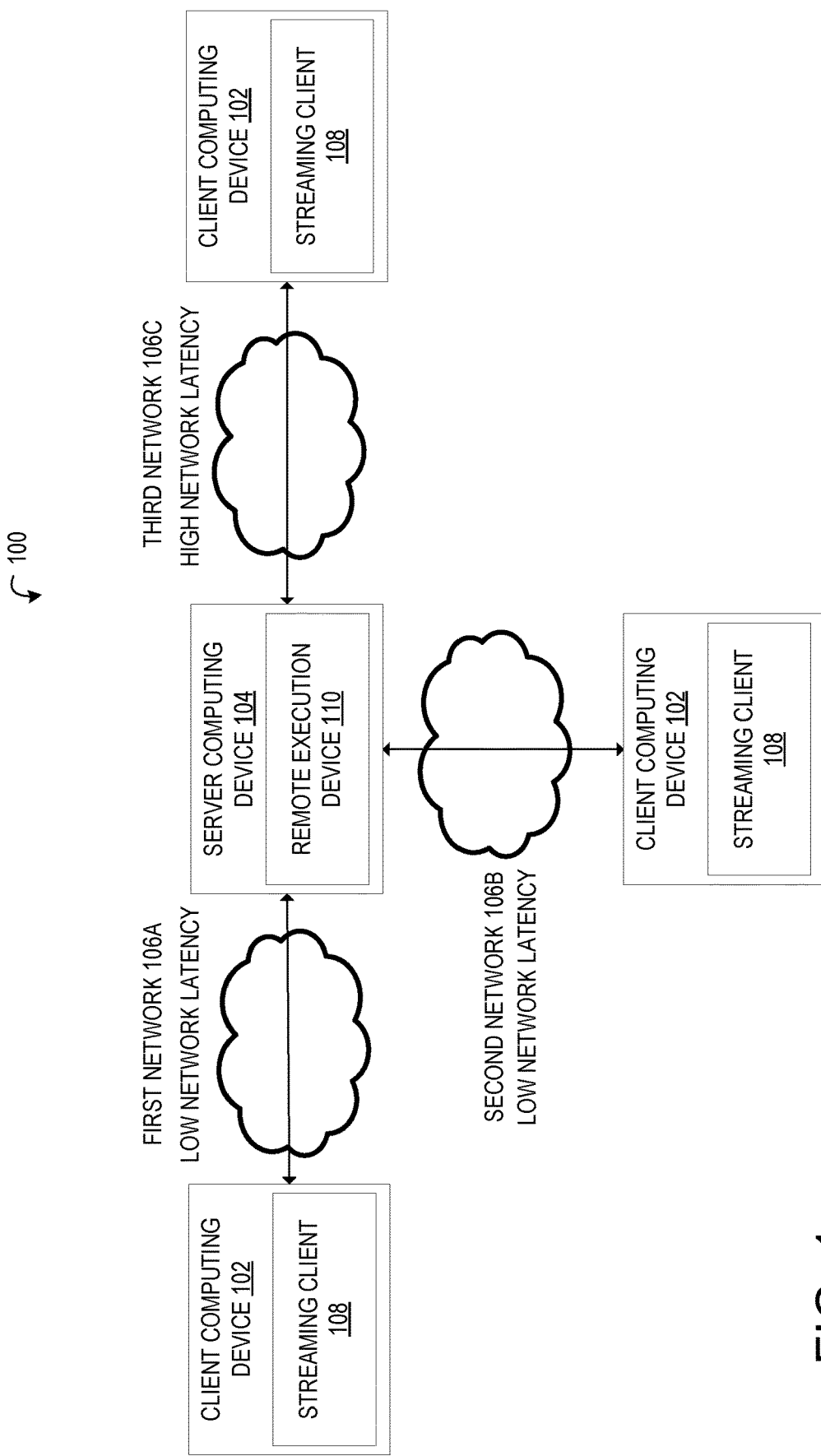
FIG. 1 shows a schematic view of an example computing system that includes client computing devices and a server computing device implementing a remote execution device according to one embodiment of the present disclosure.

However, when each player's client computing device is a thin computing device that does not locally execute and render a local software program state of the multiplayer online software program, these same latency compensation techniques may no longer be applicable. FIG. 1 illustrates an example computing system 100 that includes a plurality of client computing devices 102 configured to communicate with a server computing device 104 over respective networks 106. The server computing device 104 may comprise one or more discrete server computing devices operating in concert. In one example, the server computing device 104 may include a plurality of server computing devices that operate in a cloud computing configuration operating in concert to implement the functions and processes of the server computing device 104 described herein.

In one example, each of the client computing devices 102 may take the form of thin computing devices that do not execute their own local software program state of a multiplayer online software program. For example, the client computing devices 102 may include mobile computing devices, game streaming computing devices, tablet computing devices, streaming consoles, and other types of computing devices that may not include sufficient processing power to execute a local instance of the online multiplayer software program. As illustrated in FIG. 1, each client computing device 102 is configured to execute a streaming client 108 configured to send user input to the server computing device 104 and display output frames generated by a remote execute device 110 implemented by the server computing device 104. Alternatively, client computing device 102 may be a more powerful computer with processing power and memory capable of running a full version of the multiplayer online software program, but may nonetheless be running a thin client in the form of streaming client 108 instead.

In one example, as each client computing device 102 may be configured to display output frames generated by the remote execution device 110, and does not render its own local frames, each player's input may not necessarily be immediately reflected in the frames displayed to that user until that input has been sent to the server computing device 104 and the remote execution device 110 of the server computing device 104 has rendered output frames for each users' input. Further, as the plurality of client computing devices 102 may be located in different locations, the latency of the network for each client computing device 102 to communicate with the server computing device 104 may be different for each client computing device 102. That is, a first client computing device may be communicating with the server computing device 104 over a first network 106A, a second client computing device may be communicating with the server computing device 104 over a second network 106B, a third client computing device 102 may be communicating with the server computing device 104 over a third network 106C, and network latencies of the first, second, and third networks may each be different. If, for example, the third network 106C has a higher network latency than the first network 106A, then the user input from the first client computing device may reach the server computing device 104 faster than the user input from the third client computing device, thus potentially giving the user of the first client computing device an unfair advantage over the user of the third client computing device.

To address the issues discussed above, FIG. 2 illustrates an example server computing device 104 configured to induce latency on target input streams from client computing devices participating in an online multiplayer software program. Selectively inducing latency on targeted input streams potentially allows the server computing device 104 to mitigate the unfair effects of differing network latencies to maintain fairness among all of the participating users, as well as allow for opportunities for the server computing device 104 to reduce the bandwidth required for streaming the multiplayer online software program to the client computing devices.

Figure 2:
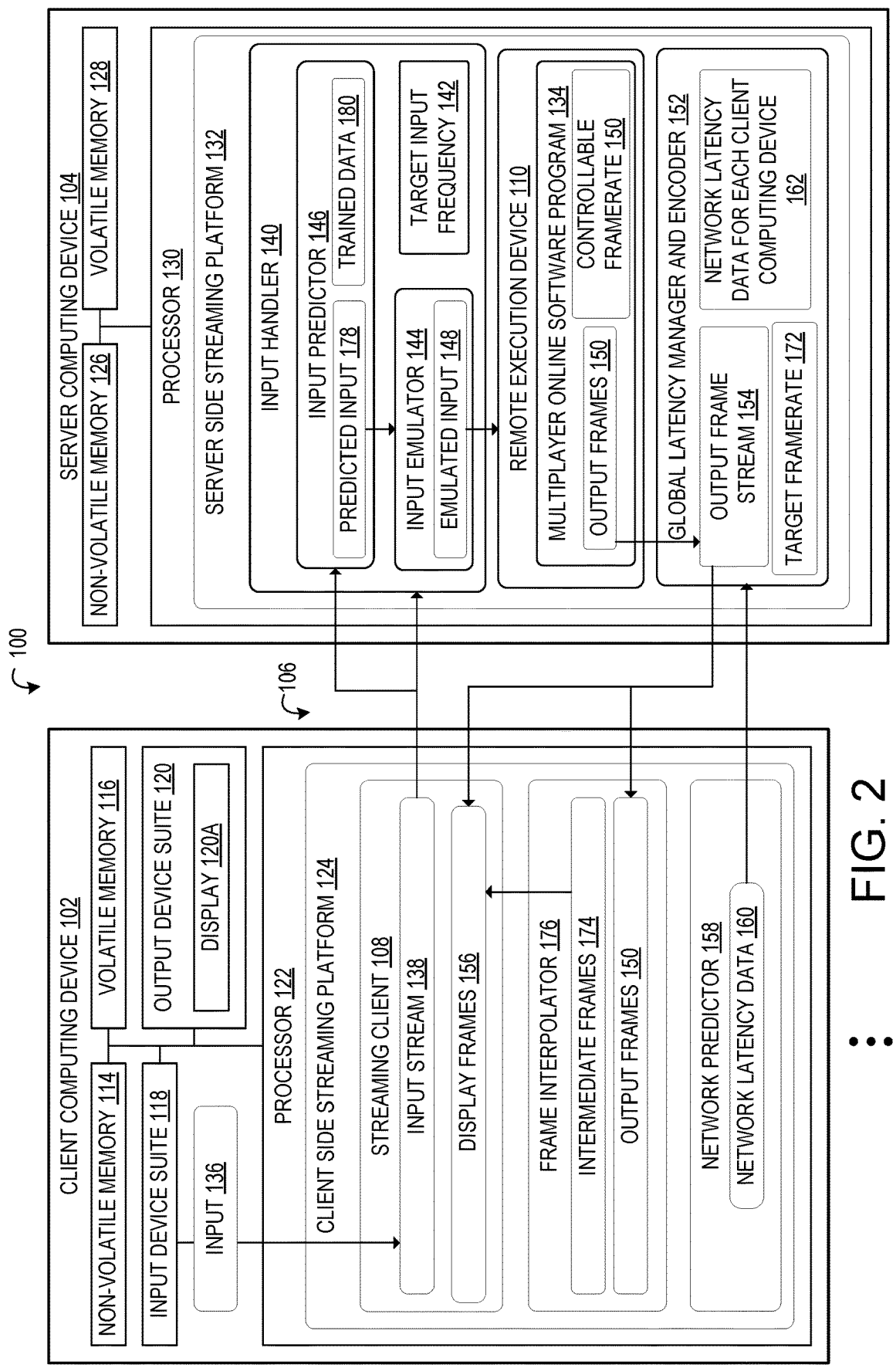
FIG. 2 shows a schematic view of the client computing devices and the server computing device of FIG. 1.

As illustrated in FIG. 2, the computing system 100 may include a plurality of client computing devices 102 configured to communicate with the server computing device 104 over respective networks 106. Each client computing device 102 may include computer components such as non-volatile memory 114, volatile memory 116, an input device suite 118, an output device suite 120, and a processor 122. The input device suite 118 may include any suitable type of input devices, such as, for example, a keyboard and mouse, a console controller, a joystick, etc. The output device suite 120 may include any suitable type of output device such as, for example, a display 120A, speakers, etc.

The processor 122 of each client computing device 102 is configured to execute a client side streaming platform 124 for a multiplayer online software program, which, for example, may take the form of an online multiplayer game, or another type of multi-user application. Each client side streaming platform 124 of each client computing device 102 is configured to communicate with the server computing device 104 over respective networks 106.

The server computing device 104 may include one or more server computing devices in different locations. For example, a first server computing device communicating with a first client computing device may be located on the West Coast of the United States, while a second server computing device communicating with a second client computing device may be located on the East Coast of the United States. In this example, the first and second server computing devices 104 may be configured to work in concert to implement the processes and methods of the server computing device 104 described herein. As illustrated in FIG. 2, each of the one or more server computing devices 104 may include computer components such as non-volatile memory 126, volatile memory 128, and a processor 130. The processor 130 of the server computing device 104 may be configured to execute a server side streaming platform 132. The client side streaming platform 124 and the server side streaming platform 132 are configured to send and receive data to each other to execute and present a multiplayer online software program 134 to respective users of each client computing device 102.

During execution of the multiplayer online software program 134, users may enter inputs 136 via the input device suite 118 of their respective client computing device 102. In one example, the multiplayer online software program 134 is an online multiplayer video game, and the plurality of inputs 136 entered by the user are inputs controlling actions of a character in the multiplayer online software program 134, such as, for example, moving, selecting, performing an action, etc. As illustrated in FIG. 2, a streaming client 108 of the client side streaming platform 124 may send the plurality of inputs 136 in an input stream 138 to the server computing device 104 over the network 106. Each client computing device 102 participating in the multiplayer online software program 134 may be configured to send input streams 138 controlling actions of respective characters in the multiplayer online software program 134 to the server computing device 104.

An input handler 140 of the server side streaming platform 132 executed by the processor 130 of the server computing device 104 may be configured to receive the plurality of input streams 138 from the respective plurality of client computing devices 102. In one example, each input 136 in plurality of input streams 138 are configured to be sent to the server computing device 104 by each client computing device 102 at a target input frequency 142, such as, for example, 1/(Target Framerate) of the multiplayer online software program 134. Each input 136 may include data regarding a state of the input device suite 118, such as, for example, which buttons are currently pressed/activated, which direction a joystick has been moved, etc. In some examples, if no input has been entered by the user to the input device suite 118, the input 136 in the input stream 138 may be a "heartbeat" input indicating that no input was entered by the user at that point in time based on the target input frequency 142. Thus, in this example, the input handler 140 of the server side streaming platform 132 may be configured to track whether inputs 136 are being received from each client computing device 102 at the target input frequency 142, and to detect any gaps in the input received from each client computing device 102.

The inputs 136 of the plurality of input streams 138 are sent to both an input emulator 144 and an input predictor 146 of the input handler 140. The input emulator 144 is configured to emulate the input types expected by a remote execution device 110 of the server computing device 104 executing the multiplayer online software program 134. As a specific example, the multiplayer online software program 134 may be a console game, and the remote execution device 110 may be a remote console device. In this example, the inputs 136 from the client computing devices 102 may be processed by the input emulator 144, which may be configured to generate emulated input 148 suitable for the type of remote execution device 110 and multiplayer online software program 134, such as console controller inputs. As the client computing devices 102 may take different forms, such as tablet computing devices, mobile computing devices, etc., and thus may have different input methods, types, and modalities, the input emulator 144 is configured to map those types of inputs into corresponding input that is suitable for the remote execution device 110. For example, if the remote execution device 110 is a remote console device and the client computing device is a desktop computing device using a keyboard and mouse, the input emulator 144 may be configured to map the keyboard and mouse inputs to corresponding console controller inputs to generate the emulated inputs 148.

The input emulator 144 of the input handler 140 is configured to perform these input emulation processes on each of the input streams received from the plurality of client computing devices 102. These emulated inputs may be sent to the remote execution device 110 in emulated input streams for each respective client computing device. The remote execution device 110 is configured to manage a software program state of the multiplayer online software program 134, and update that software program state based on the streams of emulated inputs 148 received from the input handler 140 for each of the plurality of client computing devices 102.

Based on the streams of emulated inputs 148, the remote execution device 110 may determine a current perspective of respective characters for each client computing device in a scene of the multiplayer online software program 134, and may render views of those current perspectives as output frames 150 for each client computing device 102. In one example, remote execution device 110 may be configured to render output frames 150 for a software program state of the multiplayer online software program 134 for each of the plurality of client computing device 120 at a controllable framerate 151. For example, the controllable framerate 151 may be set at 20 frames per second, 60 frames per second, or another suitable target framerate. The output frames 150 may be encoded by a global latency manager and encoder 152 of the server side streaming platform 132. The global latency manager and encoder 152 may be further configured to send the rendered output frames 150 in a plurality of output frame streams 154 to the respective plurality of client computing devices 102.

As illustrated in FIG. 2, each client computing device 102 may be configured to receive their respective output frame stream 154 from the server computing device 104. The streaming client 108 of each client computing device 102 may process the output frame stream 154 and present the output frames 150 as display frames 156 on the display 120A of the output device suite 120. For example, the streaming client 108 may process the output frames 150 based on a local resolution selected by the user, a type of the display 120A, brightness/darkness settings selected by the user, etc.

It should be appreciated that the server computing device 104 may further send other types of output alongside the output frame stream 154, such as, for example, audio output. The streaming client 108 may be configured to process these other types of outputs for presentations via the output device suite 120 alongside the display frames 156. In the manner described above, each client computing device 102 may send inputs received from the user to the server computing device 104 over respective networks 106 in an input stream, receive corresponding output frames 150 from the server computing device 104 in an output frame stream, and display those output frames on the display 120A as display frames 156.

However, as discussed previously, the respective networks 106 utilized by each client computing device 102 to communicate with the server computing device 104 may have varying network latencies and/or network stabilities.

As illustrated in FIG. 2, the client side streaming platform 124 executed by the processor 122 of each client computing device 102 further includes a network predictor 158 configured to profile the network latency and jitter of its respective network 106. For example, the network predictor 158 may be configured to send packets to the server computing device 104 and measure the round-time trip of each packet (time from sending the packet to receiving a TCP acknowledgement from the server for the packet). The network predictor 158 may analyze changes in round-time trips over time to determine short term and long term trends in the network latency and stability. In this manner, the network predictor 158 may generate network latency data 160 that includes predictions of network latency over long and short terms. The network predictor 158 may be configured to send the network latency data 160 to the global latency manager and encoder 152 of the server side stream platform 132 implemented by the server computing device 104. In one example, the global latency manager and encoder 152 may be configured to also profile the respective networks 106 used to communicate with the plurality of client computing devices 102 to similarly measure short term and long term network latency trends and stability. The network latency data 160 received from each client computing device 102 is stored and managed by the global latency manager and encoder 152.

Based on the network latency data for each client computing device 162, the global latency manager and encoder 152 is configured to determine a latency of each of the input streams 138 received respectively from the plurality of client computing devices 102. As discussed above, the respective networks 106 utilized by the plurality of client computing devices 102 may have different latencies and network stabilities. Thus, based on the determined latencies of each of the input streams 138, the global latency manager and encoder 152 may be configured to identify a higher latency input stream and a lower latency input stream among the plurality of input streams 138. In the example illustrated in FIG. 3, the input streams 138 sent by a first client computing device 102A and a second client computing device 102B are identified by the global latency manager and encoder 152 of the server computing device 104 as being lower latency inputs streams 138A and 138B. On the other hand, the input stream 138 sent by the third client computing device 102C is identified as being a higher latency input stream 138C based on the network and latency data for each client computing device 162 managed by the global latency manager and encoder 152.

Figure 3:
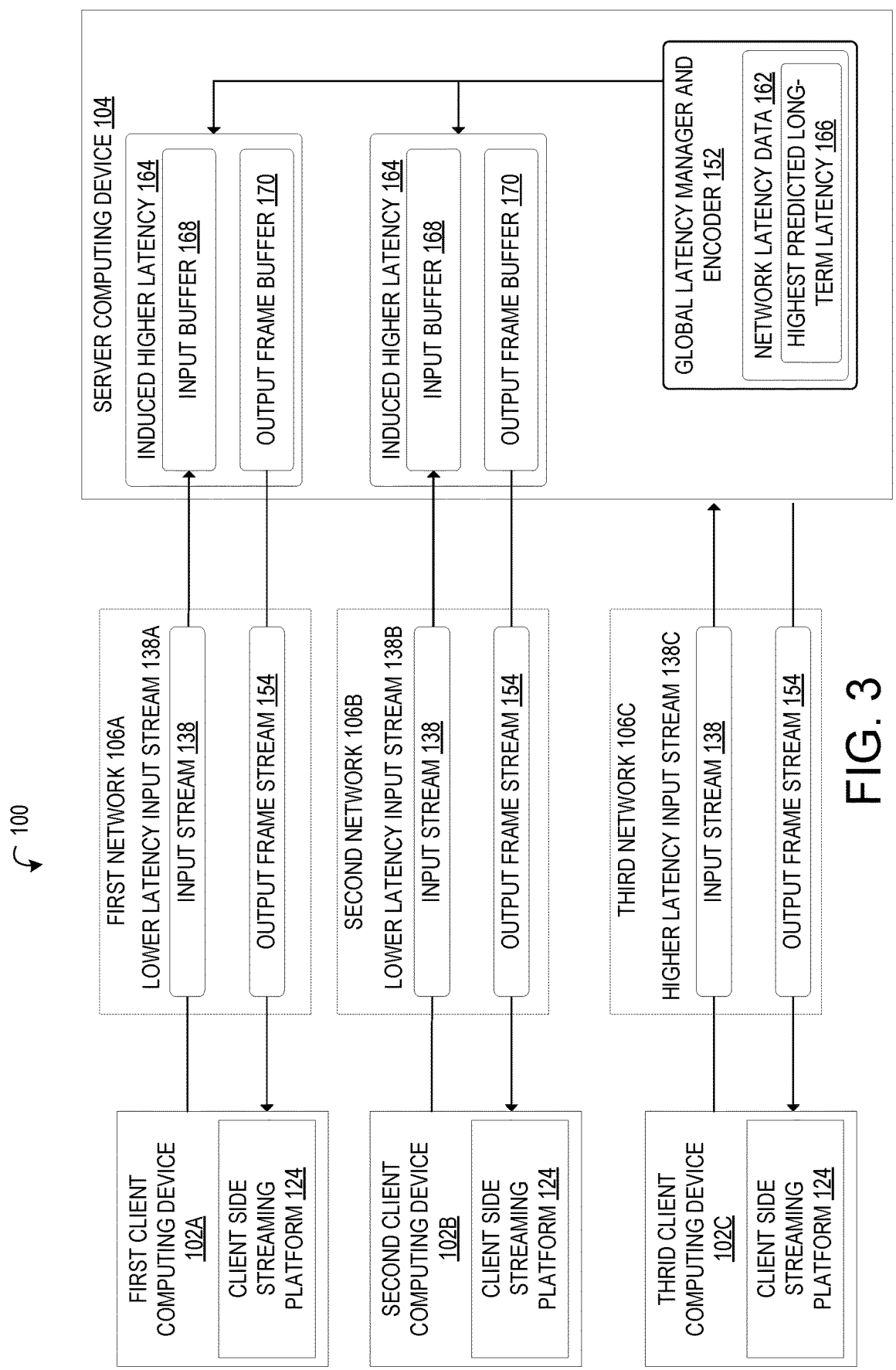
FIG. 3 shows an example of inducing higher latency in an input stream using the server computing device of FIG. 1.

After determining that at least one of the input streams received from the plurality of client computing devices 102 has a latency difference that is greater than a threshold latency compared to the other input streams, the global latency manager and encoder 152 may be configured to induce a higher latency in the lower latency input stream 138A/138B to narrow a difference in latency between the higher latency input stream 138C and the lower latency input stream 138A/138B. In one configuration, the global latency manager and encoder 152 may be configured to induce the higher latency in each other input stream other than a highest latency input stream of the plurality of input streams. For example, as illustrated in FIG. 3, the input streams 138 sent by both the first client computing device 102A and the second client computing device 102B are identified as lower latency input streams 138A and 138B. Thus, the global latency manager and encoder 152 may be configured to induce a higher latency in both of the lower latency streams 138A and 138B sent over the first network 106A and the second network 106B.

In one example, the induced higher latency 164 for each of the lower latency streams is scalable and controllable by the global latency manager and encoder 152. The global latency manager and encoder 152 may be configured to control the induced higher latency 164 based on a predicted long-term latency for each of the plurality of input streams 138, which may be determined based on the network latency data 162 received from the network predictor of each client computing device 102. That is, the global latency manager and encoder 152 may be configured to identify a highest predicted long-term latency 166 of the plurality of plurality of input streams 138, and increase the induced higher latency 164 in one or more lower latency input streams 138A/138B up to the highest predicted long-term latency 166 of the plurality of input streams 138. In this manner, the global latency manager and encoder 152 may be configured to induce increasing amounts of artificial latency into identified lower latency streams until each of the plurality of input and output streams of the client computing devices 102 have latencies within a threshold latency difference.

The global latency manager and encoder 152 may be configured to induce the higher latency on selected input streams via different methods. In one example, the global latency manager and encoder 152 may be configured to induce the higher latency by buffering inputs for each of the plurality of input streams 138. In the example illustrated in FIG. 3, each input 136 in each input stream 138 from the plurality of client computing devices 102 may be put into input buffers 168 when received by the server computing device 104. Inputs 136 for each of the lower latency input streams 138A and 138B may be held in the input buffer 168 until a corresponding input from the higher latency input stream 138C has been received by the input handler 140 of server computing device 104. Once input 136 has been received from all of the client computing devices 102, those inputs may be pulled from the input buffer 168 and sent to the remote execution device 110 which may then render corresponding output frames 150 based on those inputs. It should be appreciated that the input buffer 168 may be configured to buffer any suitable number of inputs such as one input, two inputs, three inputs, etc.

In one example, the server computing device 104 may be configured to buffer inputs from the lower latency input streams 138A and 138B independently to the output frame stream 154. That is, even though inputs are being held in the input buffers 168 while the input handler 140 waits for inputs from the higher latency input streams 138C, the remote execution device 110 may continue to render output frames 150 in the absence of new inputs at the controllable framerate 150 and send those output frames to the client computing devices 102 in respective output frame streams 154. Due to the input buffering, the end users of the client computing devices 102 having low latency input streams 138 over low latency networks will be presented with an uninterrupted stream of display frames 156 that do not yet reflect their inputs 136, and will thus perceive the multiplayer online software program 134 as being less responsive and having a higher latency. However, the visual experience of those end users will be maintained. In this manner, the perceived responsiveness (e.g. time elapsed between user input and displayed frame reflecting that input) of the multiplayer online software program 134 may be selectively decreased for users having low latency networks to match the perceived responsiveness experienced by other users having high latency networks, without degrading a framerate on the client side.

In another example, the global latency manager and encoder 152 may be configured to induce the higher latency by buffering output frames 150 for each of the plurality of output frame streams 154. As illustrated in FIG. 3, output frames 150 rendered by the remote execution device 110 may be held in respective output frame buffers 170 for each of the output frame streams 154 for the plurality of client computing devices 102. The server computing device 104 may then pull output frames 150 from the respective output frame buffers 170 to be sent to the plurality of client computing devices 102 as controlled by the global latency manager and encoder 152. For example, the global latency manager and encoder 152 may pull and send output frames 150 from the output frame buffers 170 based on the highest predicted long-term latency 166, such that the output frames 150 arrive at the client computing devices 102 at similar times. That is, output frames for the lower latency streams may be delayed in the output frame buffers 170 according to a difference in latency between the lower latency stream and the higher latency stream, such that the output frames arrive at the client computing devices at similar times. In this manner, the end users of each of the client computing devices 102 may experience similar degrees of "jitter" in the displayed frames that occurs due to high network latency such that fairness of the multiplayer online software program 134 is maintained. It should be appreciated that the input buffering and outframe buffering processes described above may be implemented together or separately by the server computing device 104.

In another example, the global latency manager and encoder 152 may be configured to induce the higher latency by decreasing the controllable framerate 150 to be less than a target framerate 172. For example, the global latency manager and encoder 152 may modify the controllable framerate 150 of the multiplayer online software program 134 based on the highest predicted long-term latency 166. That is, as the perceived responsiveness (e.g. time elapsed between user input to displayed frame reflecting that input) of the multiplayer online software program 134 will already be reduced due to high network latency, the server computing device 104 may be configured to opportunistically decrease the controllable framerate 150 of the multiplayer online software program 134. By reducing the controllable framerate 150, the output frames 150 will be rendered at a lower rate by the remote execution device 110, thus reducing the computational burden placed on the server computing device 104. Further, as there are fewer output frames 150, the required streaming bandwidth for sending the output frame stream 154 to the client computing devices will also be reduced, thus potentially saving costs and hardware resources for the server computing device 104. While reducing the controllable framerate 150 will also reduce the perceived responsiveness of the multiplayer online software program 134, the global latency manager and encoder 152 may reduce the controllable framerate 150 in proportion to the highest predicted long-term latency 166.

Reducing the framerate of the output frames 150 being displayed to the users may potentially decrease the perceived smoothness of the multiplayer online software program 134 for those users. Thus, in one example, the global latency manager and encoder 152 of the server computing device 104 may be further configured to cause each client computing device 102 to interpolate intermediate frames 174 based on one or more output frames 150 in the output frame streams 154 to achieve the target framerate 172. As illustrated in FIG. 2, the global latency manager and encoder 152 may be configured to send the output frames 150 in the output frame streams 154 for the respective client computing devices 102 to a frame interpolator 176 of the client side streaming platform 124 executed by each of those client computing devices 102. The frame interpolator 176 may be configured to interpolate an intermediate frame 174 based on a rendered output frame preceding the intermediate frame 174 and/or a rendered output frame following the intermediate frame 174. That is, if the controllable framerate 150 is 60 frames per second, and the controllable framerate 150 has been reduced to 30 frames per second, then the global latency manager and encoder 152 may be configured to instruct the frame interpolator 176 to interpolate intermediate frames 174 every other frame to achieve the target framerate 172 of 60 frames per second.

The frame interpolator 176 may be configured to interpolate intermediate frames 174 using interpolation techniques such as homography, time warping, image based rendering mesh warping, late stage reprojection techniques, neural network interpolation, and other suitable interpolation techniques. These interpolation techniques do not require full rendering processes, and may be performed on thin client computing devices that do not have adequate hardware and processing resources to perform a fully rendering processor for the multiplayer online software program 134. The interpolated intermediate frames 174 may be sent to the steaming client 108 in order with the output frames 150, and processed as the display frames 156 that are presented to the user via the display 120A at the target framerate 172. In this manner, the server computing device 104 may reduce a visual fidelity of the multiplayer online software program 134 to reduce bandwidth and hardware resource costs, while maintaining a target framerate 172 for the multiplayer online software program 134.

The global latency manager and encoder 152 may be further configured to detect short term latency changes in the input streams 138 received from the plurality of client computing devices 102 based on an expected target input frequency 142 that each client computing device 102 is expected to follow. That is, each client computing device 102 is expected to send inputs 136 at the target input frequency 142. For example, even if the user has not entered an input 136 at a particular cycle, the client computing device 102 may still send a "heartbeat" input to the server computing device 104 indicating that no input was entered by the user. Thus, the global latency manager and encoder 152 may be configured to determine the latency of each of the input streams 138 based on detecting whether inputs were received from each of the input streams 138 at the target input frequency 142. If the global latency manager and encoder 152 detects that the server computing device 104 has not received an input in the input stream 138 from a particular client computing device 102, then the global latency manager and encoder 152 may determine that there has been a short-term increase in latency or disruption in stability of the network for that particular client computing device 102.

As illustrated in FIG. 2, based on detecting that one of the input streams 138 from a client computing device 102 has missed an input, the input predictor 146 of the input handler 140 may be configured to determine a predicted input 178 to fill the missed input. The predicted input 178 may be sent to the input emulator 144, which may be configured to generate a corresponding emulated input 148 that is sent to the remote execution device 110. The remote execution device 110 may render an output frame 150 for the predicted input 178 as if the user had entered that input in the input stream 138. In this manner, missed input in the input streams 138 that occur due to short-term increases in latency and/or network stability issues may be filled by the server computing device 104 with predicted input 178.

In one example, the predicted input 178 may be determined based on trained input data 180 including a history of inputs in that input stream 138. For example, the input predictor 146 may determine the predicted input 178 based on the preceding inputs in the input stream 138. The history of inputs may be further used to generate a trained model for the user that is used to predict future inputs. The input predictor 146 may be trained with feedback from the player. Initially, the input predictor 146 may be bootstrapped for the user using an already trained model for players with similar characteristics to the user, such as, for example, favorite or most played games, the user's ranking in online services, achievements, etc.

Figure 4:
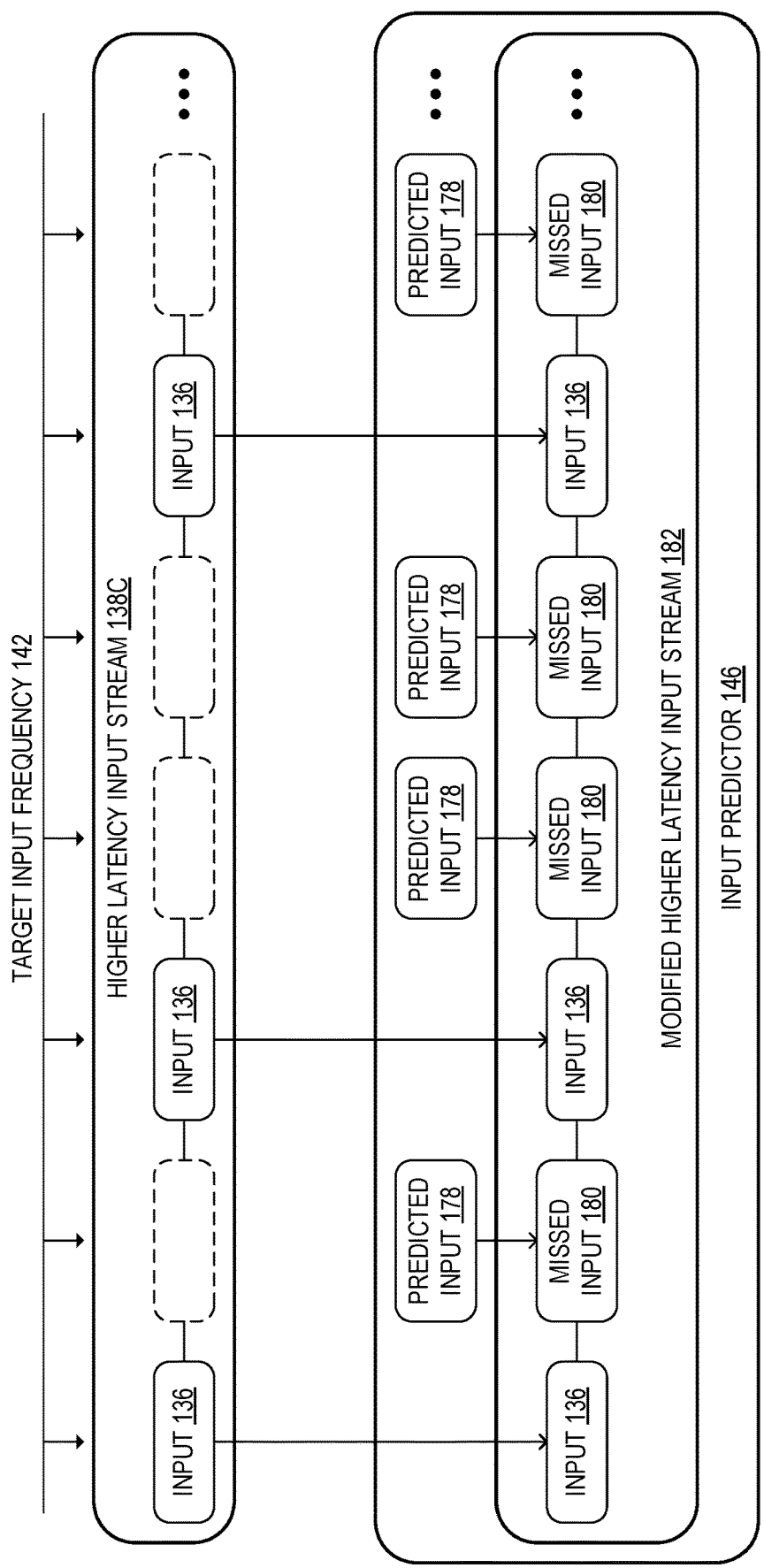
FIG. 4 shows an example of predicting user input using the server computing device of FIG. 1.

FIG. 4 illustrates an example input predictor 146 generating predicted input to fill missed input in a higher latency input stream 138C. As illustrated, the server computing device 104 expects input to be received from the client computing device 102 according to the target input frequency 142. The input handler 140 of the server side streaming platform 140 implemented by the server computing device 104 may be configured to detect a missed input 180 in the higher latency input stream 138C based on the target input frequency 142. That is, if the server computing device 104 has not received an input from the client computing device for a threshold period of time after the expected point in time, the input handler 140 may determine that the client computing device has missed an input due to short-term high latency or instability of the network between that client computing device and the server computing device 104. Upon detecting the missed input 180, the input predictor 146 may be configured to determine a predicted input 178 as discussed above, and insert the predicted input 178 into the higher latency input stream 138C to fill the missed input 180.

The example illustrated in FIG. 4 shows a sequence where only one or two inputs were missed in a row in the higher latency input stream 138C. However, in some examples, due to instability of the network, the client computing device may potentially miss more consecutive inputs, such as, for example, five inputs, ten inputs, etc. In this example, the global latency manager and encoder 152 may be configured to detect whether the higher latency input stream 138C has missed more consecutive inputs than a threshold missed input amount (which may be defined by the program developer), such as 5 inputs, 10 inputs, or 15 inputs, etc. If the higher latency input stream 138C has missed more inputs than the threshold input amount, the global latency manager and encoder 152 may be configured to halt execution of the multiplayer online software program 134 until a next input has been received in the higher latency input stream 138C. If the higher latency input stream 138C has missed fewer inputs than the threshold input amount, the global latency manager and encoder 152 may be configured to instruct the input handler 140 to pull a new input from an input buffer 168 for that input stream and/or instruct the input predictor 146 to generate a new predicted input 178 to be inserted into the missed input slot in the higher latency input stream 138C. The modified higher latency input stream 182 that includes actual input 136 and predicted input 178 may be sent to the remote execution device 110 and processed according to the methods described above.

It should be appreciated that the input predictor 146 may be implemented using any suitable combination of state-of-the-art and/or future machine learning (ML), artificial intelligence (AI), and/or natural language processing (NLP) techniques. For example, the machine learning model of the trained data 180 shown in FIG. 2 may be trained to generate state machines that are utilized by the input predictor 146 to generate the predicted input 178 for a user of a particular client computing device 102. In one example, the machine learning models may be trained based on a history of input data received from that particular client computing device 102. In another example, the machine learning models may be trained based on a history of inputs received from a plurality of different users across different game sessions over time. Additionally, machine learning models of the trained data 180 may be shared between a plurality of different server computing devices 104, which may be located in different geolocations, datacenters, etc. For example, the machine learning model of the trained data 180 shown in FIG. 2 may have been trained using input data received by a plurality of different server computing devices 104 located in different datacenters, which may each receive input data from a plurality of different client computing devices.

Non-limiting examples of techniques that may be incorporated in an implementation include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

FIG. 5 shows a flowchart of a computer-implemented method 500. The method 500 may be implemented by the server computing device of FIG. 1. At 502, the method 500 may include receiving a plurality of input streams from a respective plurality of client computing devices, each input stream including a plurality of inputs controlling actions of respective characters in a multiplayer online software program, such as, for example, moving, selecting, performing an action, etc. As described above with regard to FIG. 2, a streaming client 108 implemented by the client computing devices may send the plurality of inputs 136 in an input stream 138 to the server computing device 104 over the network 106. Each client computing device 102 participating in the multiplayer online software program 134 may be configured to send input streams 138 to the server computing device 104.

At 504, the method 500 may include determining a latency of each of the input streams. As described above with reference to FIG. 2, a network predictor 158 of the client computing devices may be configured to profile the network latency and jitter of its respective network 106. For example, the network predictor 158 may be configured to send packets to the server computing device 104 and measure the round-time trip of each packet. The network predictor 158 may analyze changes in round-time trips over time to determine short term and long term trends in the network latency and stability. In this manner, the network predictor 158 may generate network latency data 160 that includes predictions of network latency over long and short terms.

At 506, the method 500 may include predicting a long-term latency for each of the plurality of input streams. As described above with reference to FIG. 2, the predicted long-term latency for each of the plurality of input streams 138 may be determined based on the network latency data 162 received from the network predictor of each client computing device 102.

At 508, the method 500 may include identifying a higher latency input stream and a lower latency input stream among the plurality of input streams. As described with reference to FIG. 2, the global latency manager and encoder of the server computing device 104 may be configured to compare the network latency data received from the client computing device 102 and identify higher and lower input latency streams. In one example, the global latency manager and encoder may be further configured to identify that a particular input stream is a high latency input stream based on detecting that there are missed inputs in that particular input stream according to a target input frequency.

At 510, the method 500 may include inducing a higher latency in the lower latency input stream to narrow a difference in latency between the higher latency input stream and the lower latency input stream. In one example, the higher latency is induced in each other input stream other than a highest latency input stream of the plurality of input streams. The highest latency input stream may be determined based on the network latency data received from each client computing device.

At step 510, the higher latency may be induced in the low latency input stream using different techniques. In one example, inducing the higher latency includes buffering inputs for each of the plurality of input streams. As described with reference to FIG. 3, each input 136 in each input stream 138 from the plurality of client computing devices 102 may be put into input buffers 168 when received by the server computing device 104. Inputs 136 for each of the lower latency input streams 138A and 138B may be held in the input buffer 168 until a corresponding input from the higher latency input stream 138C has been received by the input handler 140 of server computing device 104. Once input 136 has been received from all of the client computing devices 102, those inputs may be pulled from the input buffer 168 and sent to the remote execution device 110 which may then render corresponding output frames 150 based on those inputs.

In another example, inducing the higher latency may include buffering output frames for each of the plurality of output frame streams. As described with reference to FIG. 3, output frames 150 rendered by the remote execution device 110 may be held in respective output frame buffers 170 for each of the output frame streams 154 for the plurality of client computing devices 102. The server computing device 104 may then pull output frames 150 from the respective output frame buffers 170 to be sent to the plurality of client computing devices 102 as controlled by the global latency manager and encoder 152.

In another example, inducing the higher latency may include decreasing the controllable framerate to be less than a target framerate. As described with reference to FIG. 3, the global latency manager and encoder 152 may modify the controllable framerate 150 of the multiplayer online software program 134 based on the highest predicted long-term latency 166. That is, as the perceived responsiveness (e.g. time elapsed between user input to displayed frame reflecting that input) of the multiplayer online software program 134 will already be reduced due to high network latency, the server computing device 104 may be configured to opportunistically decrease the controllable framerate 150 of the multiplayer online software program 134.

At 512, the method 500 may include increasing the induced higher latency in one or more lower latency input streams up to a highest predicted long-term latency of the plurality of input streams. Step 512 may include inducing increasing amounts of artificial latency into identified lower latency streams until each of the plurality of input and output streams of the client computing devices 102 have latencies within a threshold latency difference.

At 514, the method 500 may include rendering output frames for a software program state of the multiplayer online software program for each of the plurality of client computing device at a controllable framerate. As described above with reference to FIG. 2, based on the streams of emulated inputs 148, the remote execution device 110 may determine a current perspective of respective characters for each client computing device in a scene of the multiplayer online software program 134, and may render views of those current perspectives as output frames 150 for each client computing device 102.

At 516, the method 500 may include sending the rendered output frames in a plurality of output frame streams to the respective plurality of client computing devices. As discussed at step 512, the rendered output frames may be held in an output frame buffer in order to induce a higher latency on selected streams. The rendered output frames may be pulled from the output frame buffer and then sent to the associated client computing device to achieve a target induced latency in that stream.

At 518, the method 500 may include causing each client computing device to interpolate intermediate frames based on one or more output frames in the output frame streams to achieve the target framerate. As described above with reference to FIG. 2, the frame interpolator 176 implemented by the client computing device may be configured to interpolate an intermediate frame 174 based on a rendered output frame preceding the intermediate frame 174 and/or a rendered output frame following the intermediate frame 174. The frame interpolator 176 may be configured to interpolate intermediate frames 174 using interpolation techniques such as homography, time warping, image based rendering mesh warping, late stage reprojection techniques, neural network interpolation, and other suitable interpolation techniques. The output frames and the interpolated intermediate frames may be presented to the user via a display of the client computing device.

The above-described systems and methods may be utilized to maintain fairness in multiplayer sessions of online software programs by inducing latency into some player streams using a variety of techniques, to thereby enable each player to have a more similar game experience within the multiplayer session, despite each player having varying latencies in their respective network connections.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
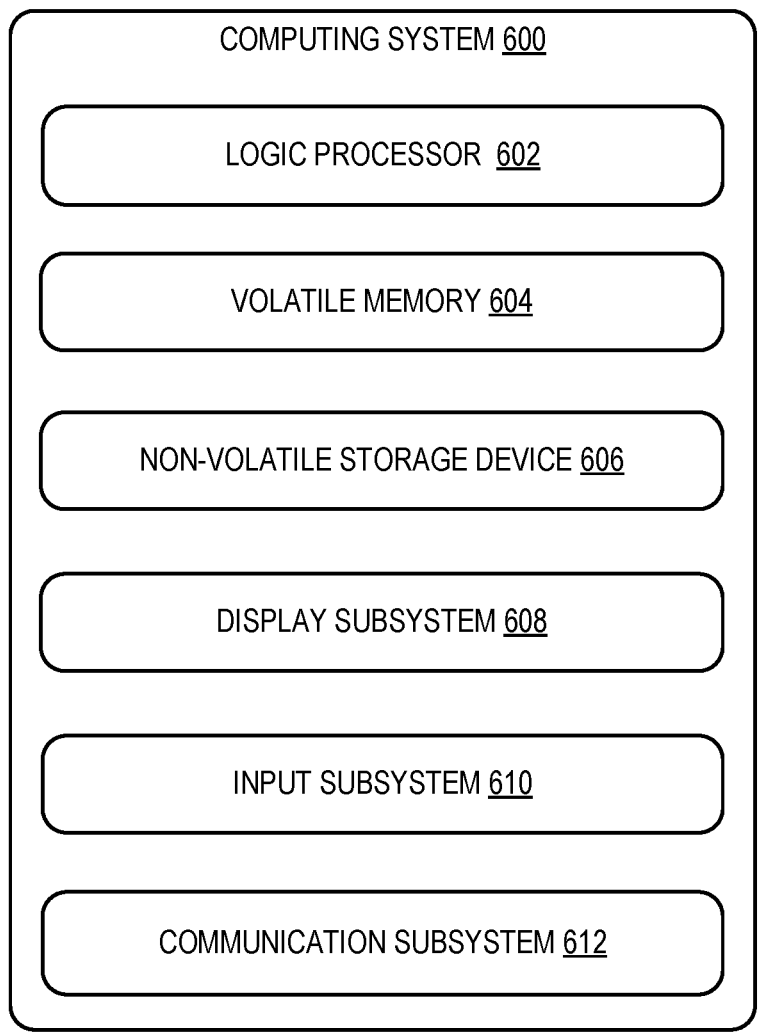
FIG. 6 shows a schematic representation of an example computing system, according to one embodiment of the present disclosure.

FIG. 6 schematically shows a non-limiting embodiment of a computing system In some embodiments, the methods and processes described herein may be tied to a computing system of one or more computing devices. In particular, such methods and processes may be implemented as a computer-application program or service, an application-programming interface (API), a library, and/or other computer-program product.

FIG. 6 schematically shows a non-limiting embodiment of a computing system 600 that can enact one or more of the methods and processes described above. Computing system 600 is shown in simplified form. Computing system 600 may embody the client computing devices 102 and server computing device 104 described above and illustrated in FIGS. 1 and 2. Computing system 600 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 600 includes a logic processor 602 volatile memory 604, and a non-volatile storage device 606. Computing system 600 may optionally include a display subsystem 608, input subsystem 610, communication subsystem 612, and/or other components not shown in FIG. 6.

Logic processor 602 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 606 includes one or more physical devices configured to hold instructions executable by the logic processors to implement the methods and processes described herein. When such methods and processes are implemented, the state of non-volatile storage device 604 may be transformed—e.g., to hold different data.

Non-volatile storage device 606 may include physical devices that are removable and/or built-in. Non-volatile storage device 604 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 606 may include nonvolatile, dynamic, static, read/write, read-only, sequential-access, location-addressable, file-addressable, and/or content-addressable devices. It will be appreciated that non-volatile storage device 606 is configured to hold instructions even when power is cut to the non-volatile storage device 606.

Volatile memory 604 may include physical devices that include random access memory. Volatile memory 604 is typically utilized by logic processor 602 to temporarily store information during processing of software instructions. It will be appreciated that volatile memory 604 typically does not continue to store instructions when power is cut to the volatile memory 604.

Aspects of logic processor 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 typically implemented in software by a processor to perform a particular function using portions of volatile memory, which function involves transformative processing that specially configures the processor to perform the function. Thus, a module, program, or engine may be instantiated via logic processor 602 executing instructions held by non-volatile storage device 606, using portions of volatile memory 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 608 may be used to present a visual representation of data held by non-volatile storage device 606. The visual representation may take the form of a graphical user interface (GUI). As the herein described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with logic processor 602, volatile memory 604, and/or non-volatile storage device 606 in a shared enclosure, or such display devices may be peripheral display devices.

When included, input subsystem 610 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 600 to send and/or receive messages to and/or from other devices via a network such as the Internet.

The following paragraphs provide additional support for the claims of the subject application. One aspect provides a server computing device, comprising a processor configured to receive a plurality of input streams from a respective plurality of client computing devices. Each input stream includes a plurality of inputs controlling actions of respective characters in a multiplayer online software program. The processor is further configured to determine a latency of each of the input streams, identify a higher latency input stream and a lower latency input stream among the plurality of input streams, and induce a higher latency in the lower latency input stream to narrow a difference in latency between the higher latency input stream and the lower latency input stream. In this aspect, additionally or alternatively, the higher latency may be induced in each other input stream other than a highest latency input stream of the plurality of input streams. In this aspect, additionally or alternatively, the processor may be further configured to predict a long-term latency for each of the plurality of input streams, and increase the induced higher latency in one or more lower latency input streams up to a highest predicted long-term latency of the plurality of input streams. In this aspect, additionally or alternatively, the processor may be configured to induce the higher latency by buffering inputs for each of the plurality of input streams. In this aspect, additionally or alternatively, the processor may be configured to render output frames for a software program state of the multiplayer online software program for each of the plurality of client computing device at a controllable framerate, and send the rendered output frames in a plurality of output frame streams to the respective plurality of client computing devices. In this aspect, additionally or alternatively, the processor may be further configured to induce the higher latency by buffering output frames for each of the plurality of output frame streams. In this aspect, additionally or alternatively, the processor may be further configured to induce the higher latency by decreasing the controllable framerate to be less than a target framerate. In this aspect, additionally or alternatively, the processor may be configured to cause each client computing device to interpolate intermediate frames based on one or more output frames in the output frame streams to achieve the target framerate. In this aspect, additionally or alternatively, the processor may be configured to determine the latency of each of the input streams based on detecting whether inputs were received from each of the input streams at a target input frequency. In this aspect, additionally or alternatively, the processor may be configured to detect a missed input in the higher latency input stream based on the target input frequency, and insert a predicted input into the higher latency input stream to fill the missed input. In this aspect, additionally or alternatively, the predicted input may be determined based on trained input data including a history of inputs in that input stream.

Another aspect provides a method comprising, at a server computing device including a processor, receiving a plurality of input streams from a respective plurality of client computing devices. Each input stream includes a plurality of inputs controlling actions of respective characters in a multiplayer online software program. The method further comprises determining a latency of each of the input streams, identifying a higher latency input stream and a lower latency input stream among the plurality of input streams, and inducing a higher latency in the lower latency input stream to narrow a difference in latency between the higher latency input stream and the lower latency input stream. In this aspect, additionally or alternatively, the higher latency may be induced in each other input stream other than a highest latency input stream of the plurality of input streams. In this aspect, additionally or alternatively, the method may further comprise predicting a long-term latency for each of the plurality of input streams, and increasing the induced higher latency in one or more lower latency input streams up to a highest predicted long-term latency of the plurality of input streams. In this aspect, additionally or alternatively, inducing the higher latency may include buffering inputs for each of the plurality of input streams. In this aspect, additionally or alternatively, the method may further comprise rendering output frames for a software program state of the multiplayer online software program for each of the plurality of client computing device at a controllable framerate, and sending the rendered output frames in a plurality of output frame streams to the respective plurality of client computing devices. In this aspect, additionally or alternatively, inducing the higher latency may include buffering output frames for each of the plurality of output frame streams. In this aspect, additionally or alternatively, inducing the higher latency may include decreasing the controllable framerate to be less than a target framerate. In this aspect, additionally or alternatively, the method may further comprise causing each client computing device to interpolate intermediate frames based on one or more output frames in the output frame streams to achieve the target framerate.

Another aspect provides a server computing device, comprising a processor configured to receive a plurality of input streams from a respective plurality of client computing devices. Each input stream includes a plurality of inputs controlling actions of respective characters in a multiplayer online software program. The processor is further configured to determine a latency of each of the input streams including a highest predicted long-term latency, identify a higher latency input stream and a lower latency input stream among the plurality of input streams; induce a higher latency in the lower latency input stream up to the highest predicted long-term latency, and detect one or more missed inputs in the higher latency input stream based on a target input frequency. If the one or more missed inputs is greater than a threshold amount of inputs, the processor is configured to halt execution of the multiplayer online software program. If the one or more missed inputs is lower than the threshold amount of inputs, the processor is configured to insert a predicted input into the higher latency input stream to fill the missed input.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A server computing device, comprising a processor configured to:
   receive a plurality of input streams from a respective plurality of client computing devices, each input stream including a plurality of inputs controlling actions of respective characters in a multiplayer game session of a multiplayer online software program;
   determine a latency of each of the input streams based at least on detecting whether inputs were received from each of the plurality of input streams at a target input frequency;
   identify a higher latency input stream and a lower latency input stream among the plurality of input streams, wherein missed inputs not received at the target input frequency are used to identify the higher latency input stream; and
   induce a higher latency in the lower latency input stream to narrow a difference in latency between the higher latency input stream and the lower latency input stream, to thereby accommodate the higher latency input stream and the lower latency input stream in the multiplayer game session.

2. The server computing device of claim 1, wherein the higher latency is induced in each other input stream other than a highest latency input stream of the plurality of input streams.

3. The server computing device of claim 1, wherein the processor is further configured to:
predict a long-term latency for each of the plurality of input streams; and
increase the induced higher latency in one or more lower latency input streams up to a highest predicted long-term latency of the plurality of input streams.

4. The server computing device of claim 1, wherein the processor is configured to induce the higher latency by buffering inputs for each of the plurality of input streams.

5. The server computing device of claim 1, wherein the processor is configured to:
render output frames for a software program state of the multiplayer online software program for each of the plurality of client computing device at a controllable framerate; and
send the rendered output frames in a plurality of output frame streams to the respective plurality of client computing devices.

6. The server computing device of claim 5, wherein the processor is further configured to induce the higher latency by buffering output frames for each of the plurality of output frame streams.

7. The server computing device of claim 5, wherein the processor is further configured to induce the higher latency by decreasing the controllable framerate to be less than a target framerate.

8. The server computing device of claim 7, wherein the processor is configured to cause each client computing device to interpolate intermediate frames based on one or more output frames in the output frame streams to achieve the target framerate.

9. The server computing device of claim 1, wherein the processor is configured to:
detect a missed input in the higher latency input stream based on the target input frequency; and
insert a predicted input into the higher latency input stream to fill the missed input.

10. The server computing device of claim 9, wherein the predicted input is determined based on trained input data including a history of inputs in that input stream.

11. A method comprising:
at a server computing device including a processor,
receiving a plurality of input streams from a respective plurality of client computing devices, each input stream including a plurality of inputs controlling actions of respective characters in a multiplayer game session of a multiplayer online software program;
determining a latency of each of the input streams based at least on detecting whether inputs were received from each of the plurality of input streams at a target input frequency;
identifying a higher latency input stream and a lower latency input stream among the plurality of input streams, wherein missed inputs not received at the target input frequency are used to identify the higher latency input stream; and
inducing a higher latency in the lower latency input stream to narrow a difference in latency between the higher latency input stream and the lower latency input stream to thereby accommodate the higher latency input stream and the lower latency input stream in the multiplayer game session.

12. The method of claim 11, wherein the higher latency is induced in each other input stream other than a highest latency input stream of the plurality of input streams.

13. The method of claim 11, further comprising:
rendering output frames for a software program state of the multiplayer online software program for each of the plurality of client computing device at a controllable framerate; and
sending the rendered output frames in a plurality of output frame streams to the respective plurality of client computing devices.

14. The method of claim 13, wherein inducing the higher latency includes buffering output frames for each of the plurality of output frame streams.

15. The method of claim 13, wherein inducing the higher latency includes decreasing the controllable framerate to be less than a target framerate.

16. The method of claim 15, further comprising causing each client computing device to interpolate intermediate frames based on one or more output frames in the output frame streams to achieve the target framerate.

17. A server computing device, comprising a processor configured to:
receive a plurality of input streams from a respective plurality of client computing devices, each input stream including a plurality of inputs controlling actions of respective characters in a multiplayer online software program;
determine a latency of each of the input streams including a highest predicted long-term latency;
identify a higher latency input stream and a lower latency input stream among the plurality of input streams;
induce a higher latency in the lower latency input stream up to the highest predicted long-term latency;
detect one or more missed inputs in the higher latency input stream based on a target input frequency;
if the one or more missed inputs is greater than a threshold amount of inputs, halt execution of the multiplayer online software program; and
if the one or more missed inputs is lower than the threshold amount of inputs, insert a predicted input into the higher latency input stream to fill the missed input.

18. The server computing device of claim 17, wherein the predicted input is determined based on trained input data including a history of inputs in that input stream.

19. The server computing device of claim 17, wherein the processor is configured to:
render output frames for a software program state of the multiplayer online software program for each of the plurality of client computing device at a controllable framerate; and
send the rendered output frames in a plurality of output frame streams to the respective plurality of client computing devices.

* * * * *